United States Patent [19]

Staber et al.

[11] Patent Number: 5,399,814
[45] Date of Patent: Mar. 21, 1995

[54] CABLE BEND CONTROL DEVICE

[75] Inventors: Harley J. Staber, Coppell; Gregory G. Costley, Roanoke, both of Tex.

[73] Assignee: Siecor Corporation, Hickory, N.C.

[21] Appl. No.: 31,511

[22] Filed: Mar. 15, 1993

[51] Int. Cl.⁶ .............................................. H01B 7/24
[52] U.S. Cl. ................................. 174/135; 174/136; 174/147
[58] Field of Search .................... 174/135, 136, 71 R, 174/72 R, 72 A, 147, 50, 65 R, 65 G, 68.1; 248/49, 65, 68.1; 211/26; 24/129 R, 129 B

[56] References Cited

U.S. PATENT DOCUMENTS

| | | | |
|---|---|---|---|
| 1,383,777 | 7/1921 | Stephens | 174/136 X |
| 1,547,220 | 7/1925 | Kipp | 174/136 X |
| 3,990,486 | 11/1976 | Quick | 140/118 |

OTHER PUBLICATIONS

Hendry Telephone Products catalog, p. 50.

*Primary Examiner*—Leo P. Picard
*Assistant Examiner*—Hyung S. Sough
*Attorney, Agent, or Firm*—J. David Abernethy

[57] ABSTRACT

Disclosed is a device for bridging a cable over an edge of an exposed flange. An bridge has a first side containing one or more slots capable of receiving the edge of the flange, and a second side curved to allow a cable to pass over the device without kinking or allowing a bend radius less than that of the second side.

1 Claim, 3 Drawing Sheets

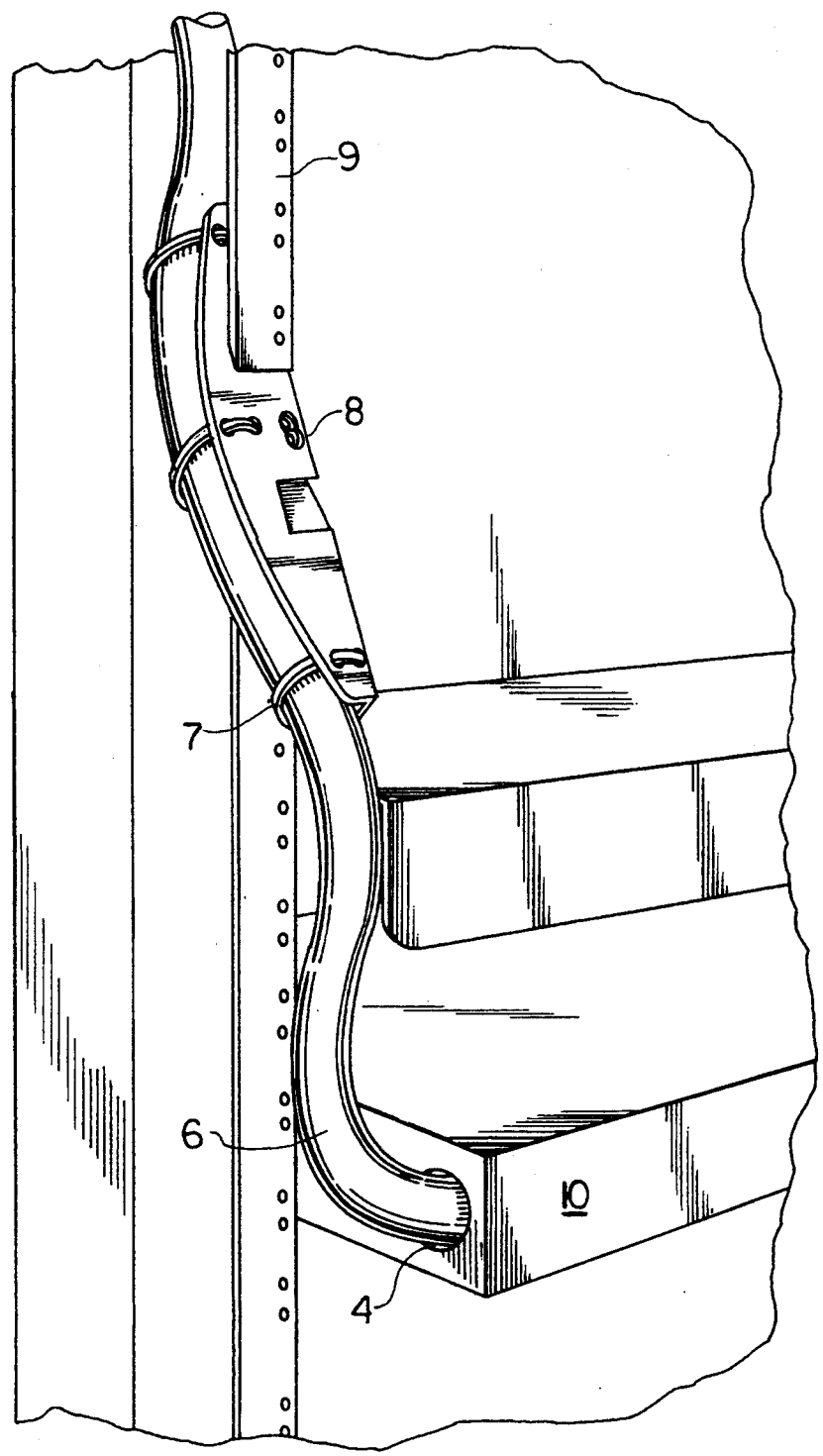

CABLE BEND CONTROL DEVICE

BACKGROUND OF THE INVENTION

Certain equipment racks used in the telephone industry have narrow protruding side flanges. Because these racks are used to house telephone equipment, it is sometimes necessary to route cables past the exposed flanges. During installation or during later rearrangements of equipment, communications cables can experience sharp bends or kinks impressed against the flanges, resulting in unwanted deterioration of the cable or even cable failure. It is therefore necessary to provide for improved means to protect cables which must pass beside such flanges.

SUMMARY OF THE INVENTION

The improved cable bridge according to the invention includes a frame having first and second opposed sides, the first side having first and second non-parallel slots therein, each of said slots capable of receiving the edge of a flange, and a second side having a convexly curved external surface between two outwardly extending sidewalls. The second side receives the cable being routed over the flange.

In the improved embodiment, the first and second slots cross each other at an angle in order to allow for one part to be used for either side of the equipment rack, or cable transition in either direction over the flange, and to make the cable bridge as compact as possible. Flexible ties can be used to secure a cable between the extended sidewalls.

BRIEF DESCRIPTION OF THE DRAWINGS

The preferred embodiment is described with reference to the drawings, in which:

FIG. 3 is a perspective view of the cable bridge as installed over a flange and having a cable routed thereover.

DETAILED DESCRIPTION OF THE PREFERRED EMBODIMENT

Figure 1:
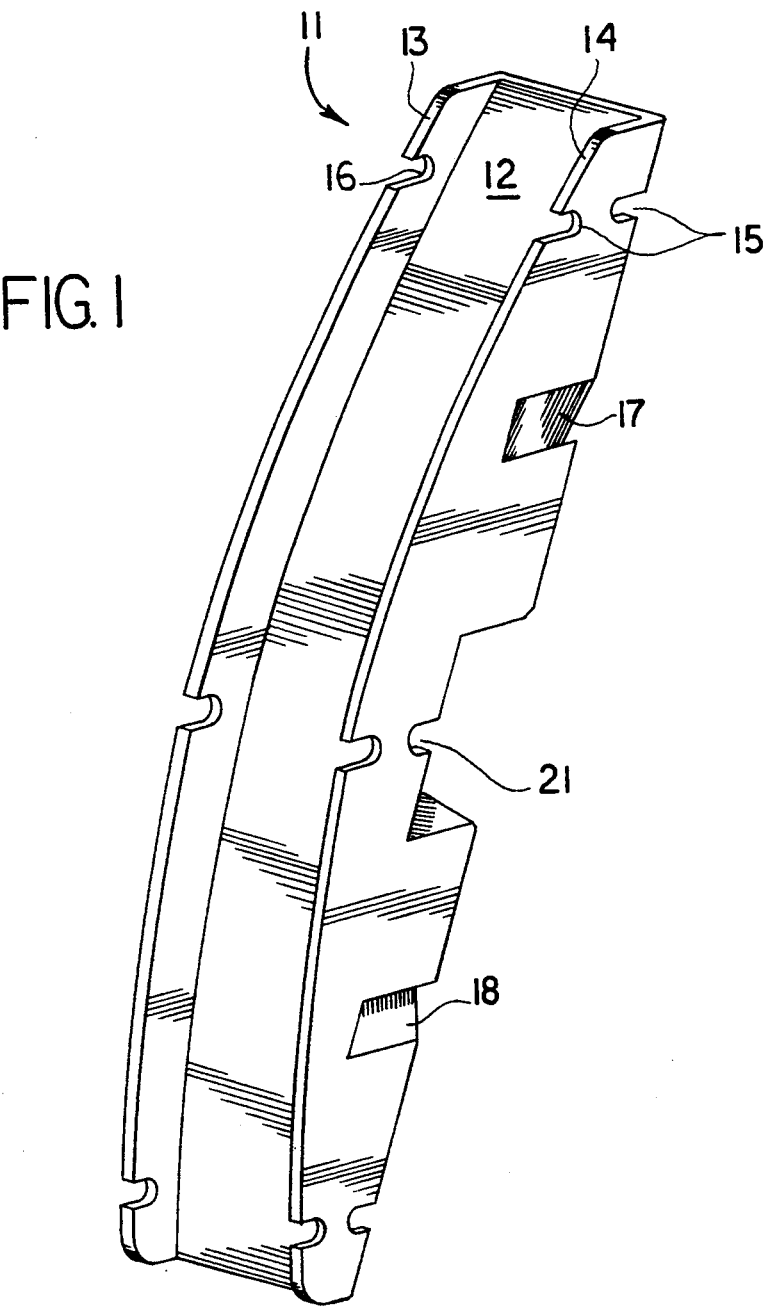
FIG. 1 is a perspective view of the second side of the cable bridge.

The cable bridge first embodiment as shown in FIG. 1 is a frame that provides a second side 11 having a convexly curved external surface 12 between two outwardly extending sidewalls 13, 14. A cable to be routed over an exposed flange is seated in the channel formed by surface 12 and sidewalls 13, 14. A flexible tie may be inserted around slots such as 15, 16 or 21 in order to secure the cable within the channel.

Figure 2:
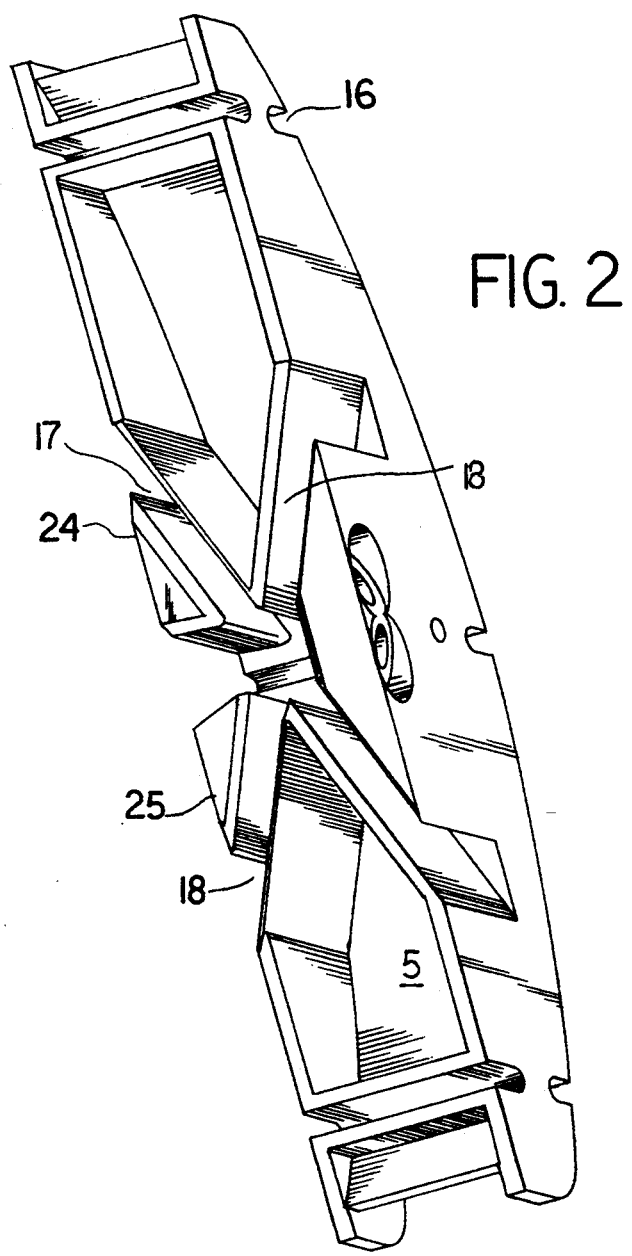
FIG. 2 is a perspective view of the first side of the cable bridge.

First side 5 of the cable bridge is displayed in FIG. 2. First side 5 contains non parallel slots 17, 18 which in the preferred embodiment intersect each other at an angle. Slots 17, 18 allow the cable bridge to be angled to the direction desired. Side holes may be used to seat a screw holding the cable bridge on an exposed flange. In the first embodiment, a gap is left between surfaces 24, 25. The gap is filled in the second embodiment of FIG. 3.

The cable bridge second embodiment is shown as installed in FIG. 3, with screw 8 inserted in a hole in the side of the cable bridge to secure the cable bridge to exposed flange 9. Flexible ties 7 secure cable 6 within the channel of the cable bridge. In this embodiment, holes rather than slots are used to secure the ties. Cable 6 then proceeds through entrance port 4 in shelf 10.

The improved cable bridge advantageously preserves the minimum bend radius of cable 6, maintains a low profile over flange 9, and provides crush protection through sidewalls 13, 14.

An additional advantage of the improved cable bridge is that it can be molded from recycled plastic scrap materials, reducing the addition of plastic scrap to the environment.

What is claimed is:

1. A cable bridge for traversing a cable over a narrow edge of a flat flange, comprising a frame having first and second sides, the first side having two narrow slots therein either of which can be used to receive the flange edge therein, the slots intersecting each other at an angle other than a right angle; and the second side having a convexly curved exterior surface for receiving a cable and two outwardly extending parallel sidewalls at least partially bounding the convexly curved exterior second side surface, the sidewalls not parallel to either the first or second slot.

* * * * *